United States Patent
Yamazaki et al.

[11] Patent Number: 6,151,057
[45] Date of Patent: Nov. 21, 2000

[54] OPTICALLY CONTROLLED IMAGE FORMING APPARATUS AND METHOD

[75] Inventors: Kouzou Yamazaki, Isehara; Hideaki Mochimaru, Atsugi, both of Japan

[73] Assignee: Ricoh Company, Ltd., Tokyo, Japan

[21] Appl. No.: 08/738,695

[22] Filed: Oct. 28, 1996

[30] Foreign Application Priority Data

Oct. 26, 1995 [JP] Japan ................................. 7-303646

[51] Int. Cl.$^7$ ................................................ B41J 2/435
[52] U.S. Cl. ........................... 347/248; 347/247; 347/235
[58] Field of Search ................................. 347/248, 250, 347/257, 262, 263, 264, 261, 235, 241, 256; 359/217, 216

[56] References Cited

U.S. PATENT DOCUMENTS

| | | | |
|---|---|---|---|
| 4,397,521 | 8/1983 | Antos et al. | 359/217 |
| 4,853,710 | 8/1989 | Shimada et al. | 347/261 |
| 5,081,544 | 1/1992 | Kikuchi et al. | 359/212 |
| 5,329,299 | 7/1994 | Odagiri et al. | 347/263 |
| 5,438,354 | 8/1995 | Genovese | 347/256 |
| 5,479,201 | 12/1995 | Sugiura et al. | 347/257 |
| 5,510,827 | 4/1996 | Kubota et al. | 347/257 |

*Primary Examiner*—N. Le
*Assistant Examiner*—Hai C. Pham
*Attorney, Agent, or Firm*—Oblon, Spivak, McClelland, Maier & Neustadt, P.C.

[57] ABSTRACT

An image forming apparatus and method that provides a laser beam oscillator that provides a laser beam corresponding to an original image, reflects/scans the laser beam, transmits a first part of said laser beam to a photoconductive element to write thereupon an image indicative of the original image, accepts a second part of the laser beam as to control and synchronize a write timing sequence of the laser beam on the image carrying element.

11 Claims, 3 Drawing Sheets

OPTICALLY CONTROLLED IMAGE FORMING APPARATUS AND METHOD

BACKGROUND OF THE INVENTION

1. Field of the Invention

The present invention relates to an image forming apparatus and method for controlling the image forming apparatus, such as a reproduction machine or the like.

2. Discussion of the Background

In a conventional image forming apparatus such as a reproduction machine, each part for image forming process is unitized (modularized) into units (or modules) for sake of convenience to support emergency and preventive maintenance operation on the apparatus. To this end, electrical parts of each unit are connected to a control board which controls an entire operation of the apparatus, via wiring harnesses. The image forming apparatus is also provided with an optical writing unit that writes an original image on an image carrying element based upon a laser beam from a laser oscillator which outputs the laser beam according to the original image signal. A light accepting device, connected through a harness, synchronizes write timing sequences of the laser beam on the image carrying element. This kind of apparatus, and a method for accepting a part of the laser beam of the optical writing unit by the light accepting device is disclosed in Japanese Laid-Open Patent No. 182152. Included in an optical writing unit is a laser unit and a polygon motor, each of which is connected to opposite connectors via a harness respectively connected to the control board, and an optical fiber for detecting a synchronizing signal from a light accepting device. A tip end connector of the optical fiber is connected to a connector of an opposite circuit so that connections are surely made.

An optical-transmitting device (which utilize the optical fiber) is disclosed in Japanese Laid-open Utility Model Application No. 182152/1986. An attaching technique is also disclosed for preventing breaking of the optical fiber by making the attaching direction of both ends of the optical fiber to the connectors parallel to one another.

Japanese Laid-Open Patent Application No. 131253/1990, discloses an image forming apparatus in which the connector of at least one of an optical writing unit, a developing unit, a fixing unit, a discharging unit, and a cleaning unit is directly connected to another connector of a control board which executes an entire operation of the image forming apparatus, so that a risk of mis-wiring and generating noise are reduced by omitting the harnesses. However, in order to be effective, the harness and the optical fiber must be wired, and connectors must be installed by hand for each of the electrical subcomponents. Even though this approach results in preventing a breaking of the optical fiber, the technique of JP 182152/1986 is incorporated, so the risk of mis-wiring and other assembly problems must be dealt with.

Japanese Laid-Open Patent Application No. 131253/1990 discloses another assembly method where a harness is not needed. However, there are many limitations with this method such as ambiguity regarding a direction of connecting or disconnecting of the connectors, the layout of the control board, and large apparatus size.

SUMMARY OF THE INVENTION

Accordingly, one object of this invention is to provide a novel method and apparatus that addresses the above-identified problems that stem from the use of standard fiber optics, wiring harnesses, and connectors.

Another object of the present invention is to provide an image forming apparatus without a need for an optical fiber or connector, without risk of misconnecting a harness, exhibiting simplified assembly work, and having a reduced number of parts and manufacturing cost.

Another object of the present invention is to mount a light acceptor on a control board which controls an operation of the image forming apparatus, and is fixed to a stationary part of the image forming apparatus so as to keep the light acceptor in a predetermined posture.

It is yet another object of the present invention to provide an image forming apparatus with the control board positioned so as to guide a stream of air in an internal space of the apparatus towards an outside of the apparatus.

It is still a further object of the invention to provide a method for accomplishing the above identified objects.

In accordance with the object of the present invention, an image forming apparatus is provided with a laser oscillator which outputs a laser beam according to an original image signal, a reflector/scanner which reflects/scans the laser beam from the laser oscillator, a transmitter which transmits the laser beam, a part of which writes an image on an image carrying element and a light acceptor that directly accepts a part of the laser beam reflected/scanned by the reflector/scanner to synchronize writing timing of the laser beam on a image carrying element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
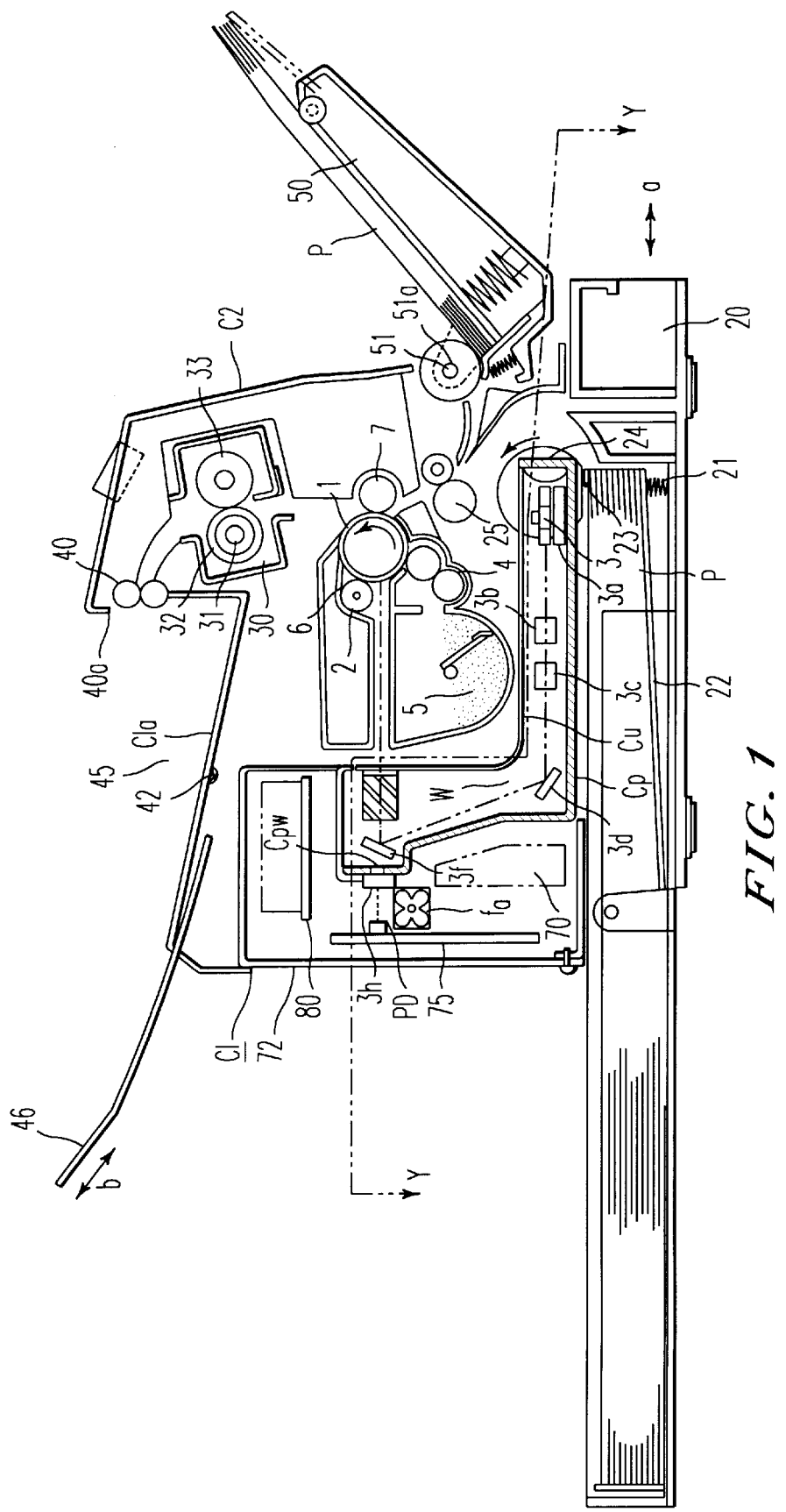
FIG. 1 is a side view of an entire construction of the image forming apparatus according to the present invention.

Referring now to the drawings, wherein like reference numerals designate identical or corresponding parts throughout the several views, and more particularly to FIG. 1 thereof, the image forming apparatus in the present invention is separated into two parts such as a case C1 on a rear side of the image forming apparatus and another case C2 on a front side of the image forming apparatus. A feeding cassette, 20, in which a sheet P is contained is detachably in a moving direction indicated by an arrow "a" mounted beneath the apparatus. A hand feeding cassette 50 is detachably mounted under the case C2 at an end part of the hand feeding cassette 50.

A feeding roller 51 for hand feeding is mounted at a stationary part of the image forming apparatus. At a center position of a shaft of the roller 51, a pin 51a is fixed to the case C2 for rotation of the roller 51 relative to the apparatus. The case C2 also rotates relative to the apparatus about the pin 51a in a clockwise direction from the position shown in FIG. 1 to the open position shown in FIG. 3. The open position opens the conveying path for the sheet P for convenient access during emergency or preventive maintenance operations.

An upper face of the case C1 serves as a discharging tray 45. Parallel to the upper face of the case C1, a discharging sheet stopper 46 is detachably mounted (removed) by moving the inert stopper 46 in a direction indicated by an arrow "b". The discharging sheet stopper 46 may be pulled out a distance matching a desired distance so a discharging sheet of a specific size is prevented from falling from the image forming apparatus. In addition, at an approximately center position of the upper face of the case C1, a rotation fulcrum 42 is formed about which a tip portion C1*a* of the case C1 is held for rotation relative to the apparatus in a counterclockwise direction.

An image carrying element (hereinafter called a photoconductive element 1 in this embodiment) on which an image forming operation is executed is held for rotation relative to the apparatus about a center of a shaft in the case C1. A cleaning unit 6, which cleans remaining toner from the photoconductive element 1, is disposed to face a peripheral surface of the photoconductive element 1. Proceeding counterclockwise from the cleaning unit 6, a charging unit 2 is positioned to charge the photoconductive element 1 uniformly, a developing unit 4 is positioned to develop a latent image on the photoconductive element 1 with a toner 5, a transferring unit 7 is positioned to transfer a toner image from the photoconductive element 1 to a sheet P facing the peripheral surface thereof.

Regarding transporting the sheet P, the sheet P is originally disposed in the feeding cassette 20 and is pushed upwards by an arm 21 with a spring (not shown). A roller 24 is disposed at an end position of the sheet P and the case C1 and feeds the sheet P from the cassette 20 into the case C1. A registration roller 25 is disposed in the case C1 between a feeding roller 24 and the transferring unit 7. By transporting the sheet P in this way, the developed image is transported to the sheet P.

Disposed adjacent to a rear part of the transferring unit 7, a fixing unit 30 is provided with a pressing roller 33 and a fixing roller 32, which includes a heater 31, is used to fix the toner image to the sheet P. A discharging roller assembly 40 is disposed near a discharging opening 41*a*, formed between a tip portion C1*a* of the case C1 and the case C2.

Figure 2:
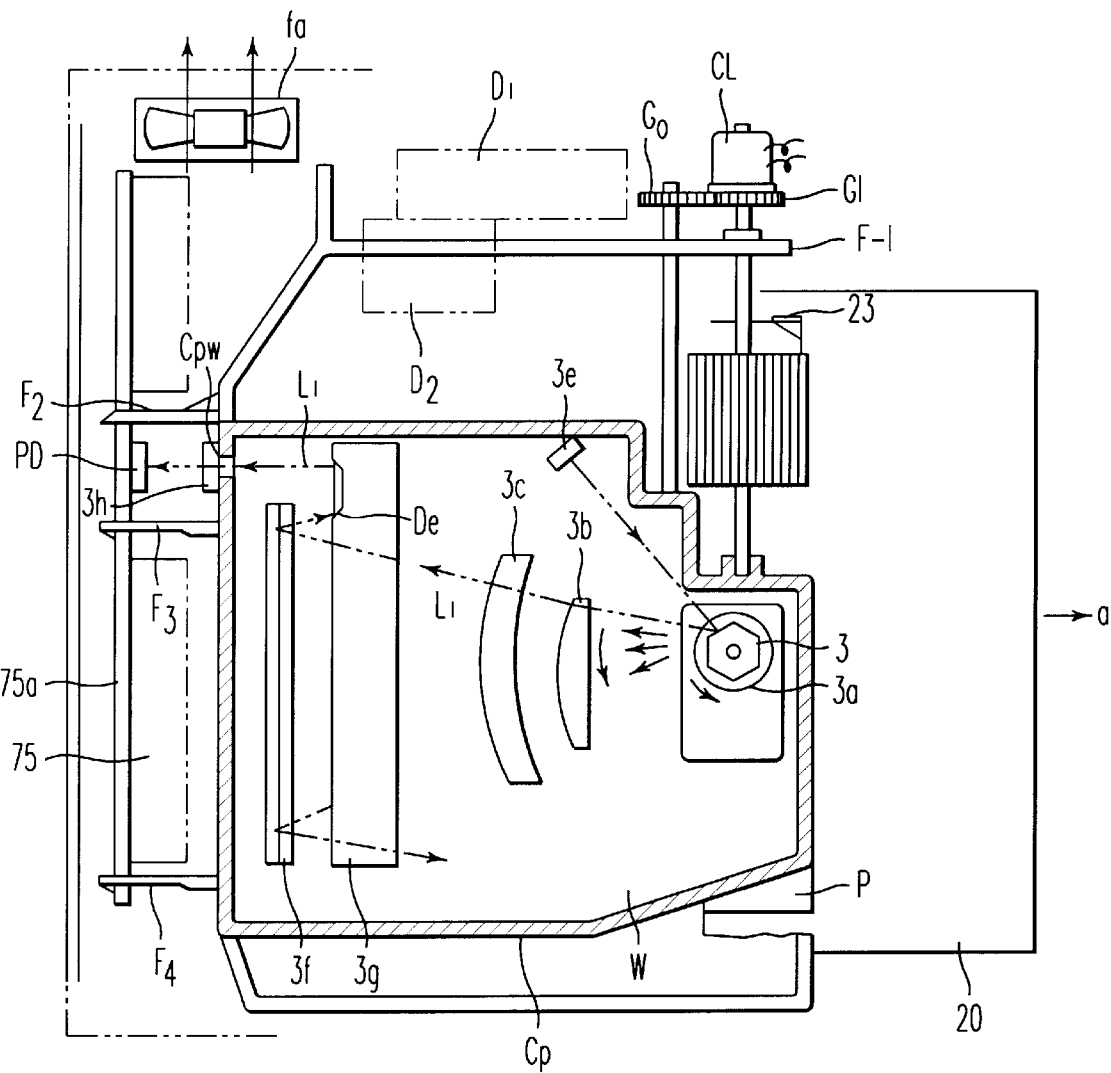
FIG. 2 is a cross sectional view of Y—Y in FIG. 1.

As shown in FIG. 2, a motor D2, a gear-box D1 and a gear "Go" are mounted on a stationary part F-1 which is fixed on a frame F of the apparatus. A gear G1 is mounted on a rotating shaft 24*a* of the feeding roller 24. Engaging or disengaging of the gear G1 to the gear Go is changeable by a clutch CL. Therefore, rotation of the motor D2 is transmitted to the feeding roller 24 via the gear-box D1, the gear Go, and the gear G1 by turning the clutch CL on.

Also shown in FIG. 2 is an optical writing unit case Cp having, approximately, an L-shape and disposed adjoining to the developing unit 4 (FIG. 1). In case Cp, a laser oscillator 3*e* is disposed (as is a polygonal mirror 3 which is rotated by a polygon motor 3*a*). An optical writing unit W formed by lenses 3*b*, 3*c*, 3*g*, mirrors 3*d* (FIGS. 1 and 3), 3*f* is also disposed within case Cp. The photoconductive element 1 (FIG. 1) is exposed with the laser beam according to an original image signal at a position between the charging unit 2 and the developing unit 4 by the lens 3*g*. A resulting electrostatic latent image is formed on the peripheral surface of the photoconductive element 1.

As shown in FIG. 1, to prevent dust slipping into the optical writing unit case Cp, an upper face of the optical writing case Cp is sealed by a cover Cu. Adjoining the optical writing unit case Cp, a case 72 in which a power source 70, an engine driver board 75, and a control board 80 are contained is disposed. A fan "fa" is provided for air cooling an internal space of the image forming apparatus. The fan, fa, is disposed at a side wall of the case 72.

In the present invention, the laser beam that is generated from the laser oscillator 3*e* (FIG. 2) is reflected/scanned by the polygonal mirror 3, rotated by the motor 3*a*, and is passed through the lens 3*b* and 3*c*. The beam is then reflected by the mirrors 3*d* and 3*f* (FIG. 3), and is converged by the lens 3*g* so that the photoconductive element 1 is exposed with the laser beam thereby forming an image at the peripheral surface between the charging unit 2 and the developing unit 4. When the photoconductive element 1 is exposed with the laser beam, a part of the laser beam is reflected in a reverse direction from the photoconductive element 1 at a circumferential edge part of the lens 3*g* (see, e.g., FIG. 2), and is transmitted into the case 72 through the opening Cpw which is formed on the optical writing unit case Cp, and through a cylinder lens 3*h*.

A photo diode PD (photo detector) is fixed to a control board 75*a* on an engine driver board 75 which is disposed in the case 72 facing to the opening Cpw so as to receive the laser beam. The control board 75*a* of the engine driver board 75 is fixed on a pin-like shaped fixing part $F_2$, $F_3$, $F_4$ of a frame "F" of the apparatus which is preferably made of a glass-fiber-reinforced plastic. The control board 75*a* on the engine driver board 75 is fixed to the frame F by the fixing part F2, F3, F4 to maintain a posture capable of accepting the laser beam reflected from the lens 3*g* of the optical writing unit W.

Operation of the present invention is described below.

During an image forming mode of operation, the case C2 is closed as shown in FIG. 1, and residual toner on the peripheral surface of the photoconductive element 1 is cleaned by the cleaning unit 6. Then, the peripheral surface of the photoconductive element 1 is uniformly charged by the charging unit 2, and the charged peripheral surface of the photoconductive element 1 is exposed with the part of laser beam according to the original image. The electrostatic latent image of the original image is written on the peripheral surface of the photoconductive element 1 by the optical writing unit W (FIG. 2).

Figure 3:
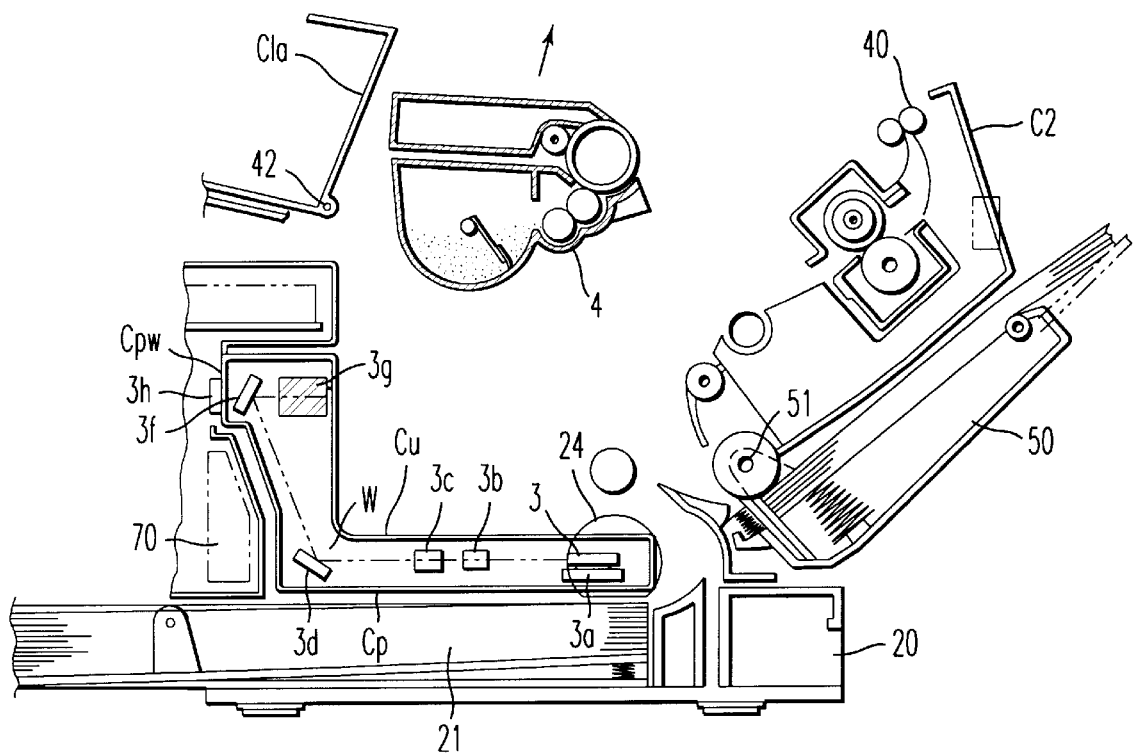
FIG. 3 is a partial side view of the image forming apparatus in an open state, illustrating a conveying path of a sheet.

More particularly, with reference to FIG. 3, the laser beam is passed through the lenses 3*b* and 3*c* and is reflected to the lens 3*g* via the mirror 3*d* and the mirror 3*f*. Thus, an image on the photoconductive element 1 at the position between the charging unit 2 and the developing unit 4 is formed by the laser beam according to the original image. However, as shown in FIG. 2, when the laser beam reaches a circumferential edge part of the lens 3*g* (due to scanning of the polygon mirror 3), the laser beam is refracted towards a direction of the reflecting/scanning of the laser beam by the polygonal mirror 3, and is accepted by the photo diode PD via a cylinder lens 3*h* in each scan respectively. In this case, the laser beam is preferably directed to the photodetector PD by a deviation, De, formed on a back surface of the lens 3*g*. Optical writing is controlled based upon accepting the laser beam by the photo diode PD and the photo diode's conversion of the optical energy contained in the laser beam into an electrical control signal used by the control board 75*a*.

Once the electrostatic latent image formed on the photoconductive element 1 reaches the developing unit 4, the electrostatic latent image is developed by the toner 5 in the developing unit 4, and a toner image is formed which corresponds to the original image that was first formed on the photoconductive element 1.

Then, synchronized with a timing sequence of the toner image formed on the photoconductive element 1 after the toner image reaches the transferring unit 7, the sheet P is fed from the feeding cassette 20, or fed from the hand feeding cassette 50, and conveyed to of the transferring unit 7 where the toner image is transferred to the sheet P by the transferring unit 7.

The sheet P on which the toner image is thus transferred by the transferring unit 7 is separated from the photoconductive element 1, and is conveyed into the fixing unit 30 through the conveying path, and is caught in between the pressing roller 33 and a fixing roller 32 which is heated by the heater 31. The toner image is fixed on the sheet P by heating and pressing the sheet P with the rollers 32 and 33. Then, the sheet is discharged through a discharging opening 40a by the discharging roller 40 and onto the discharging tray 45 at which the discharging sheet stopper 46 is pulled out according to a size of the sheet P.

Furthermore, according to this embodiment and for preventing harmful effects of various kinds to the various parts of the apparatus by heated gases released from the power source 70, fixing unit 30 or the like, the apparatus is air-cooled by rotating the fan "fa". The fan, fa, exhausts the heated gas to the outside of the apparatus in a direction indicated by double arrows as shown in FIG. 2.

According to the simplified maintenance structure associated with this embodiment, when an operator is obliged to repair the apparatus due to a sheet jam or the like, or in a case of preventive maintenance, the case C2 is rotated in a clockwise direction, and the conveying path of the sheet P is opened outwards. In addition, the tip portion C1a of the case C1 is rotated in a counterclockwise direction about a rotation fulcrum 42 so that an internal space of the image forming apparatus is opened widely.

In this state, the sheet jam is repaired by pulling upwards and taking off the jammed sheet P in the apparatus, or various kinds of repair and the preventive maintenance such that exchanged parts may be readily performed by taking the worn/damaged parts out of the developing unit 4 (see FIG. 3).

In the manner as stated above, according to this embodiment of the present invention, a direct laser beam transmission from the optical writing unit W to the photo diode PD is executed without an optical fiber or connector communicating the optical writing unit W and the photo diode PD arrangement. The complex assembly work associated with optical fibers is avoided by the present invention as is the risk of mis-connection of connectors with harnesses because the photo diode PD is mounted on the control board 75a so to receive the laser beam. The number of parts and assembly of the apparatus are both reduced, and therefore the manufacturing cost is reduced relative to conventional apparatuses, because the control board 75a on which the photo diode PD is mounted is used as a stream guide for channelling and exhausting air-cooling gases. Consequently, highly reliable optical writing operation is realized and the repair and the preventive maintenance of the apparatus are performed with ease.

Obviously numerous modifications and variations of the present invention are possible in light of the above teachings. It is therefore, to be understood that within the scope of the appended claims, the invention may be practiced otherwise than specifically described herein.

What is claimed as new and desired to be secured by Letters Patent of the United States is:

1. An image forming apparatus comprising:
    a laser oscillator that generates a laser beam according to an original image signal corresponding to an original image;
    means for reflecting/scanning the laser beam from said laser oscillator;
    means for transmitting, including at least one lens, a first part of said laser beam after being reflected/scanned by said reflecting/scanning means towards an image carrying element to write thereupon an image indicative of the original image;
    light accepting means for accepting a second part of the laser beam, after the second part of the laser beam is deflected off a portion of said at least one lens of said means for transmitting, and for generating a synchronization signal so as to synchronize a write timing sequence of the laser beam on the image carrying element; and
    a control structure on which said laser light accepting means is directly mounted in a predetermined posture, said control structure including an engine driver control and being configured to control an optical writing operation of said image forming apparatus based on said synchronization signal, and said at least one lens of said means for transmitting formed separated from said control structure.

2. An image forming apparatus according to claim 1, wherein said control structure comprises a control board disposed so as to guide a stream of gas from an internal space of the apparatus to outside of the apparatus.

3. The image forming apparatus of claim 1, further comprising rotatable cover means for covering the image forming apparatus during an operational mode of operation and for uncovering internal components of said image forming apparatus during a maintenance mode of operation.

4. An image forming apparatus according to claim 1, wherein said at least one lens of said means for transmitting includes a reflective means for reflecting the second part of the laser beam to said light accepting means.

5. An image forming apparatus comprising:
    a laser oscillator that generates a laser beam corresponding to an original image;
    a reflector/scanner that reflects/scans the laser beam generated by said laser oscillator;
    a transmitter, including at least one lens, which transfers a first part of the reflected/scanned laser beam by said reflector/scanner towards an image carrying element to write thereupon an image corresponding to the original image;
    a light acceptor configured to generate a synchronization signal in response to accepting a second part of the laser beam after the second part of the laser beam is deflected off a portion of said at least one lens of said transmitter; and
    a control structure including an engine driver control and which controls an optical writing operation of said image forming apparatus based on said synchronization signal so as to synchronize a write timing sequence of the reflected/scanned layer beam on the image carrying element, said light acceptor directly mounted in a predetermined posture on said control structure, said at least one lens of said transmitter formed separated from said control structure.

6. The image forming apparatus according to claim 5, wherein said reflector/scanner is configured to simultaneously reflect/scan the first part of said laser beam toward said image carrying element, and the second part of said laser beam to said light acceptor.

7. The image forming apparatus according to claim 6, wherein said at least one lens of said transmitter comprises a deviation formed thereon which directs said second part of said laser beam toward said light acceptor.

8. The image forming apparatus of claim 7, wherein said control structure comprises a control board disposed so as to guide a stream of gas from an internal space of the apparatus to outside of the apparatus.

9. The image forming apparatus of claim 8, further comprising a fan configured to draw said stream of gas from said internal space to outside of the apparatus.

10. The image forming apparatus of claim 5, further comprising:

a first case rotatably attached to a first side of said image forming apparatus; and a second case rotatably attached to a second side of said image forming apparatus, wherein during an operational mode of operation, said first case and said second case being in a closed position so as to cover at least one of said laser oscillator, said reflector/scanner, said transmitter, said light acceptor and said controller and during a maintenance mode of operation said first case and said second case being rotated to respective open positions so as to uncover at least one of said laser oscillator, said reflector/scanner, said transmitter, said light acceptor and said controller for ease of maintenance.

11. A method for optically controlling an image forming apparatus, comprising the steps of:

generating a laser beam;

oscillating the laser beam according to an original image signal corresponding to an original image;

reflecting the laser beam;

transmitting the reflected laser beam towards an image carrying element through at least one lens;

writing an image on said image carrying element with a first portion of said reflected laser beam;

transducing a second portion of said reflected laser beam, after the second portion of said reflected laser beam is deflected off a portion of the at least one lens, to provide a control signal with a light sensor directly mounted to a control structure including an engine driver control structure, the at least one lens formed separated from the control structure; and controlling with the control structure an optical write operation based on said control signal.

* * * * *